United States Patent [19]
Evans et al.

[11] Patent Number: 5,534,759
[45] Date of Patent: Jul. 9, 1996

[54] ELECTRIC VEHICLE MONITORING SYSTEM

[75] Inventors: Le Andra E. Evans, Groton; Robert J. White, Waterford; Russell L. Brown, Niantic; Kenneth R. Galliher, Mystic; Mark E. Carlson, Gales Ferry, all of Conn.

[73] Assignee: The United States of America as represented by the Secretary of the Navy, Washington, D.C.

[21] Appl. No.: 445,152

[22] Filed: May 19, 1995

[51] Int. Cl.⁶ ............................................. H02P 1/00
[52] U.S. Cl. ..................... 318/139; 180/65.1; 318/641; 318/490; 318/648
[58] Field of Search ........................ 318/139, 641, 318/648, 490; 180/65.1, 53.5; 320/48; 364/424.05, 551.01

[56] References Cited

U.S. PATENT DOCUMENTS

| | | | |
|---|---|---|---|
| 4,234,840 | 11/1980 | Konrad et al. | 320/48 |
| 4,593,357 | 6/1986 | Van Ostrand et al. | 364/424 |
| 4,662,472 | 5/1987 | Christianson et al. | 180/53.5 X |
| 5,212,431 | 5/1993 | Origuchi et al. | 318/139 |
| 5,497,070 | 3/1996 | Furutani et al. | 320/48 X |

Primary Examiner—William M. Shoop, Jr.
Assistant Examiner—Karen Masih
Attorney, Agent, or Firm—Michael J. McGowan; Prithvi C. Lall; Michael F. Oglo

[57] ABSTRACT

An Electric Vehicle Monitoring System (EVMS) for measuring the performance of an electric vehicle. The preferred embodiment of the system comprises: (1) a variety of sensors for obtaining data on vehicle performance and operating parameters; (2) a digital dashboard display providing the vehicle operator with information on vehicle operating parameters; (3) a data acquisition system for collecting the data from the sensors and converting the data to digital format; and (4) a processing unit in the form of a removable, portable or notebook computer used for storing, evaluating and providing reports of the digital format data. The EVMS is adapted for use in a vehicle specifically designed for electric propulsion or for use in an internal combustion engine vehicle converted to electrical power use. The sensors include voltmeters, ammeters, thermocouples, optical shaft encoders and an inclinometer and provide data to both the operator display and the data acquisition system. The operator display includes bargraphs for current draw, motor and battery temperature, accessory battery voltage, main battery voltage or "fuel level" and alphanumeric displays for vehicle speed, distance traveled, trip meter and transmission gear indicator.

13 Claims, 2 Drawing Sheets

ELECTRIC VEHICLE MONITORING SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

1. Field of the Invention

The present invention relates to electric vehicle performance monitoring systems and more particularly to a system for measuring the performance of an electrically powered vehicle by providing a number of sensors within the vehicle; collecting the data from the sensors through a data acquisition system; storing, evaluating and providing reports of the data through a processing unit; and displaying data to the vehicle operator through a digital and bargraph dashboard display.

2. Description of the Prior Art

It is well known that various sensors, data collection equipment and meters can be used to measure the performance of a motor vehicle. Van Ostrand et al, U.S. Pat. No. 4,593,357, disclose a vehicle monitoring system used in testing vehicle performance characteristics. The Van Ostrand et al monitoring system comprises distance and fuel sensors, a computer for calculating performance characteristics from data supplied from the sensors, digital displays and analog outputs. The system is an example of those having the operator displays separate from the standard instrument cluster, or dashboard displays. Fuel-mileage computers, as disclosed in Watson, U.S. Pat. No. 3,549,868, have been incorporated into dashboard displays, but have been limited in the performance characteristics being monitored. The Van Ostrand et al system and the Watson fuel-mileage computer are examples of prior art vehicle monitoring systems developed for use in internal combustion engine vehicles. Such monitoring systems are normally powered by the vehicle battery which can be charged by operation of the internal combustion engine. The need for minimizing power draw from the battery is not critical to the functioning of the vehicle.

In an internal combustion engine vehicle, information from such instrumentation as fuel gages, speedometers and the like is displayed to the vehicle operator in an instrument cluster, or dashboard. When an electric vehicle (EV) is built using an internal combustion engine chassis as a base, the standard internal combustion instrument cluster or dashboard is already in use. For an EV, some of this information, such as fuel level, is unnecessary and needs to be replaced. Those instruments inappropriate for use with the EV are disconnected, but typically left in place. The EV instrumentation displays, typically including a voltmeter and a current meter, are usually mounted to the side of the existing dashboard near the radio or glove compartment of the vehicle. These separate devices do not present the vehicle operator with the salient information in a convenient location for safety and ease of use. The disadvantages are twofold: (1) the driver must take his/her eyes off the road long enough to focus on small instruments located in an unconventional area, and (2) prime locations on the dashboard are assigned to non-functional instruments. Further, such instruments do not record data in a standardized repeatable manner. Rather they serve only to display the analog signals received from sensors in the vehicle and cannot be used as a vehicle monitoring system.

SUMMARY OF THE INVENTION

Accordingly, it is a general purpose and object of the present invention to provide a vehicle performance monitoring system for an electric powered vehicle.

It is a further object that such performance monitoring system have a display integrated with the vehicle operator dashboard display.

Another object is that the dashboard display be adapted specifically for the electrical vehicle instrumentation.

Still another object is that the monitoring system draw a minimum of current from the accessory battery.

A still further object is to record data from a variety of sensors within the electric vehicle in a standardized repeatable manner.

These objects are accomplished with the present invention by providing a system for monitoring the performance of an EV. The system includes a number of sensors within the vehicle which obtain data on parameters having an effect on the performance of the EV. In the preferred embodiment, data from the sensors is displayed to the vehicle operator in a dashboard type display. The operating parameters displayed include standard motor vehicle parameters such as speed, distance travelled, motor temperature and fuel level. The fuel level indicator is adapted to indicate instantaneous voltage on the main battery system. In addition, operating parameters specific to EV functioning are displayed and include instantaneous current draw on the main battery to indicate efficient operation, accessory battery voltage and battery temperature. Data from the sensors is also collected through a data acquisition system for input into a processing unit. The data acquisition system serves to convert the data from the sensors into digital format for use by the processing unit. In the preferred embodiment, the processing unit is a removable portable computer having its own internal power supply to reduce draw down of the accessory battery. The processing unit also senses the position of the ignition switch, entering "sleep mode" when the ignition switch is turned off to further conserve power.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein.

DESCRIPTION OF THE PREFERRED EMBODIMENT

Figure 1:
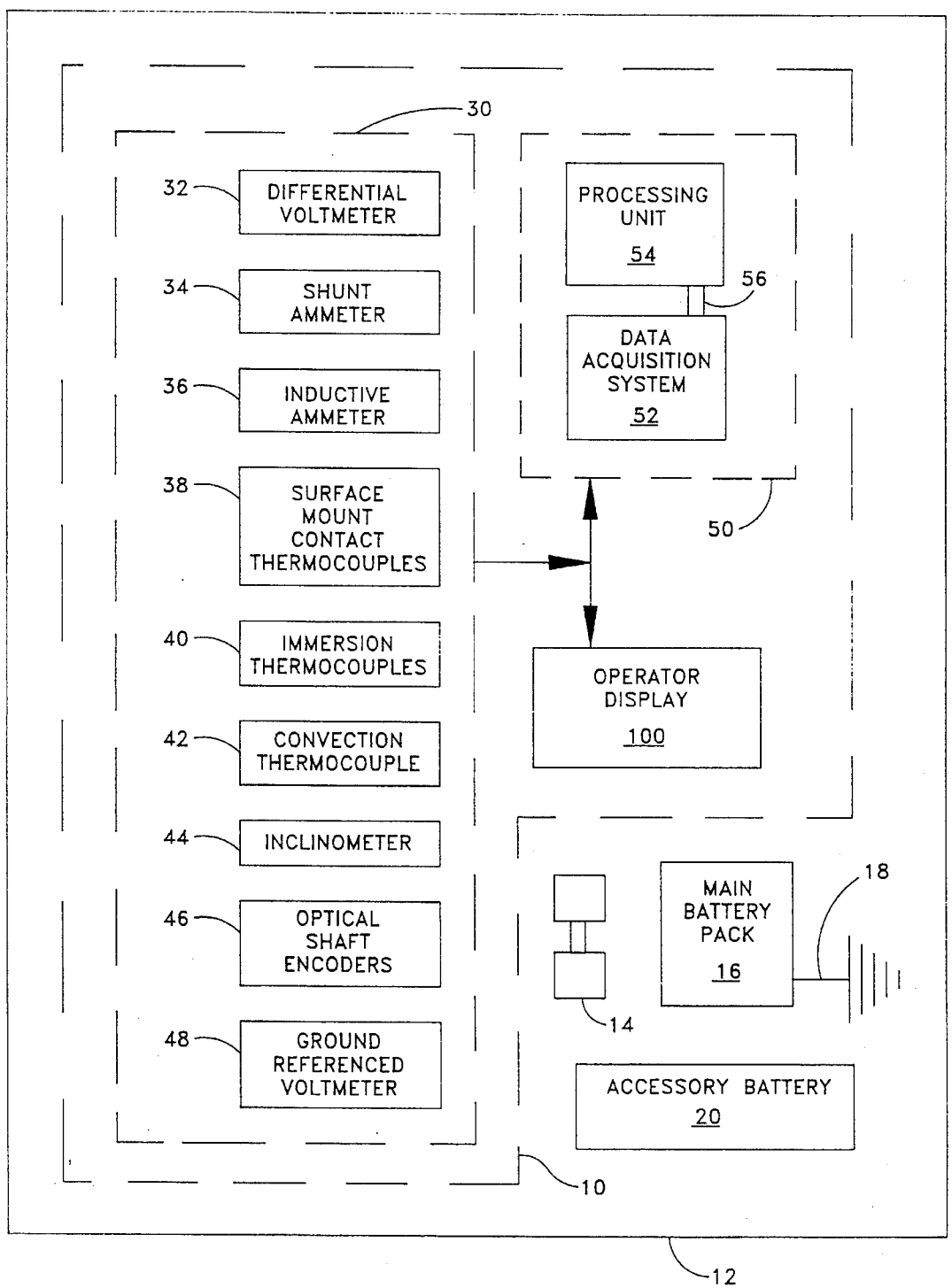
FIG. 1 shows a block diagram of the EV monitoring system.

Referring now to FIG. 1, there is shown at 10 an Electric Vehicle Monitoring System (EVMS) for measuring the performance of an Electric Vehicle (EV) 12. EV 12 is powered by electric motor 14 driven by main battery pack 16 having a chassis ground 18. Accessory battery 20 powers other subsystems of EV 12 such as the sensor subsystem 30 and operator display 100 of EVMS 10. Sensor subsystem 30 measures data necessary to determine the performance of EV 12. First differential voltmeter 32 is ground isolated allowing the voltage of main battery pack 16 to be measured without providing a path to chassis ground 18. Shunt ammeter 34 measures main battery pack 16 current draw in the operating condition and inductive ammeter 36 provides data on main battery pack 16 current draw in both the operating and charging conditions. Surface mount contact thermocouples 38 are used to sense the case temperature of main battery pack 16 and electric motor 14 temperature. Acid resistant immersion thermocouples 40 and convection thermocouple 42 sense main battery pack 16 electrolyte temperature and outside air temperature, respectively. Absolute inclinometer 44 provides data on the grade or incline of the road being travelled. Optical shaft encoders 46 are used to provide vehicle speed, miles travelled and electric motor 14 speed (revolutions per minute) information. Ground referenced voltmeter 48 provides data on accessory battery 20 voltage.

Data from sensor subsystem 30 is transmitted to data management subsystem 50. The data from sensor subsystem 30 is collected through data acquisition system (DAS) 52. DAS 52 can be any commercially available DAS such as the DAQbook Model 100. Processing unit 54 stores and reports the data collected through DAS 52 in a standardized format. In the preferred embodiment, processing unit 54 is a portable or notebook type computer connected to DAS 52 by a standard parallel port connector 56 and having a standard user interface screen and input keyboard. Custom software is used to store, interpret and generate reports of the data collected. Preferably, the data may also be stored on a removable disk device for further processing and analysis. The use of custom software allows additional data to be input into EVMS 10, such as vehicle operator name, route being followed, general weather conditions, and the like, and may also provide graphic screen prompts for aiding user input.

Figure 2:
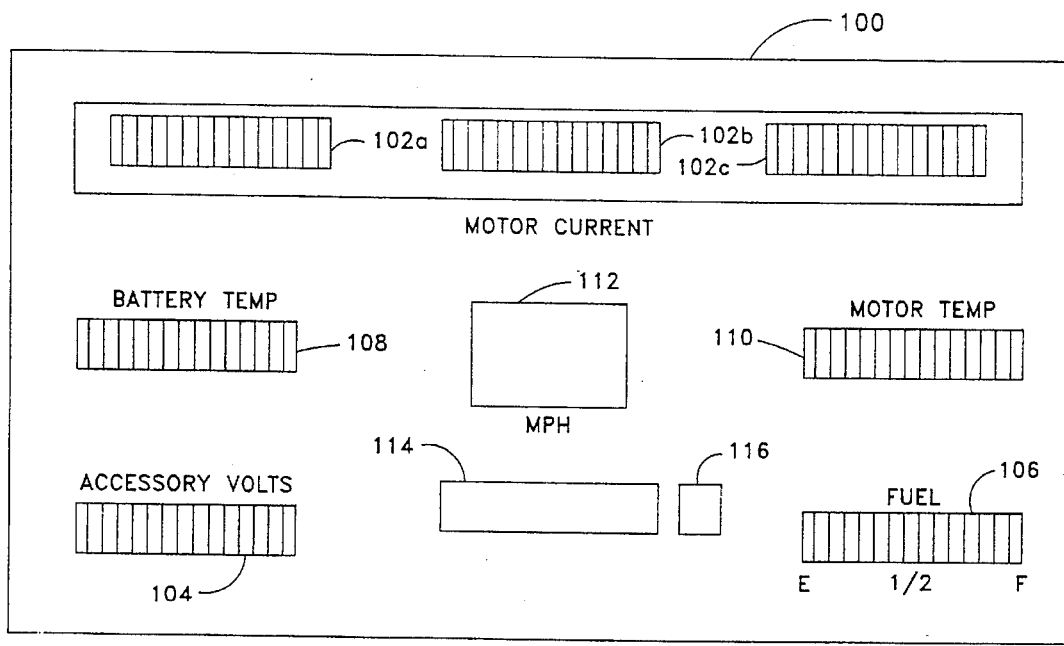
FIG. 2 shows an EV dashboard type display.

Referring now additionally to FIG. 2, operator display 100 integrates all the information required to operate EV 12 efficiently into a single display. Electric vehicles are oftentimes built on an internal combustion engine vehicle chassis. In the preferred embodiment, operator display 100 is a replacement dashboard, such as Dakota Digital model STR2000, modified to display information relevant to the operation of EV 12. It replaces the standard internal combustion engine dashboard display and mounts in the conventional dashboard location. This provides all important operating information together in the proper location to promote safe vehicle operation and ease of use. Further, replacement of the internal combustion engine dashboard removes extraneous gages and displays associated with the internal combustion engine. An operator of EV 12 will not be distracted by non-functional instrumentation.

Such replacement dashboards present vehicle operating parameters in digital and bargraph type displays. In the preferred embodiment, operator display 100 includes instantaneous current draw bargraphs 102a, 102b and 102c. In operation, successive elements of current draw bargraphs 102a, 102b and 102c are illuminated as current draw increases. First current draw bargraph 102a covers the range of 0–200 amperes; second current draw bargraph 102b covers the range of 200–300 amperes; and third current draw bargraph 102c covers the range of 300–400 amperes. The extent of illumination corresponds to the actual current draw on main battery pack 16 as measured by shunt ammeter 34. Current draw bargraphs 102a, 102b and 102c may be color coded to indicate efficient operating ranges for EV 12.

Accessory battery voltage bargraph 104 is used to display accessory battery 20 voltage as measured by ground referenced voltmeter 48. Fuel level bargraph 106 indicates instantaneous voltage on main battery pack 16 as measured by first differential voltmeter 32. Battery temperature bargraph 108 and motor temperature bargraph 110 display information received from thermocouples 38. Speedometer 112, odometer and trip meter 114 and transmission gear indicator 116 receive information from optical shaft encoders 46 and provide alphanumeric displays for speed, miles travelled and gear engagement, respectively.

Figure 3:
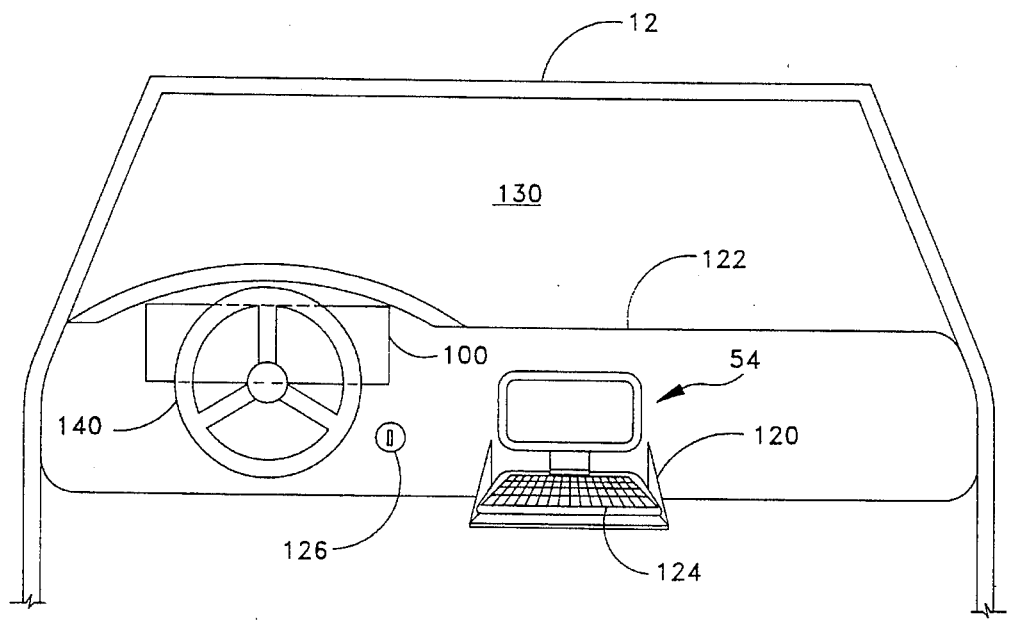
FIG. 3 shows a schematic partial interior view of an EV with the monitoring system installed.

Referring now to FIG. 3, there is shown a schematic partial interior view of EV 12 as would be seen by an operator of EV 12. The view is taken looking forward through windshield 130 and past steering wheel 140. EV 12 may be a vehicle specifically constructed for electric power operation or it may be an internal combustion engine vehicle, such as a pick-up truck, or the like, converted to operate on electric power. Operator display 100 is positioned in the conventional dashboard location. The types of display, whether bargraph or alphanumeric, ranges displayed, the number of divisions displayed, or the colors of the displays may be selected and arranged to suit the particular operating parameters of EV 12.

Processing unit 54 may be mounted anywhere within EV 12. In the preferred embodiment of FIG. 3, processing unit 54 is shown mounted on rack 120. Rack 120 is constructed so as to mount to front console 122 of EV 12. When the keyboard section 124 of processing unit 54 is not in use, rack 120 may be folded up against console 122. Connection to DAS 52 (not shown) is through the rear of rack 120. A further connection (not shown) is provided from processing unit 54, through DAS 52, to EV 12 ignition switch 126. Alternatively, this connection may be separate from DAS 52.

In operation, EVMS 10 is activated by first turning on processing unit 54. The operating mode, either Run Vehicle or Charge Vehicle, is selected and any additional data is entered into processing unit 54. The remainder of EVMS 10 is activated by sensing the position of ignition switch 126. The use of a portable or notebook type computer with its own power source for processing unit 54 conserves power for EV 12 operation. In the configuration of the preferred embodiment, EVMS 10 draws less than two hundred milliamperes from accessory battery 20. Additionally, processing unit 54 is configured to enter a "sleep mode" or standby condition when ignition switch 126 is turned off, further conserving processing unit 54 internal power.

The use of a portable or notebook type computer for processing unit 54 also provides a convenient platform for further experimentation. Such computer platforms are well known, easily programmable and economical. The built in display of such a notebook computer may be utilized for real time display of EV 12 performance. Various operating parameters may be adjusted during operation to increase performance with immediate results available to the experimenter. Additionally, once testing is complete and EV 12 is returned to normal operation, processing unit 54 and DAS 52 may be removed leaving sensor subsystem 30 and operator display 100 in place. DAS 52 and processing unit 54 may also be re-installed for diagnostic servicing of EV 12.

What has thus been described is an electric vehicle monitoring system 10 for measuring the performance of an electric vehicle 12. The preferred embodiment of the system comprises: (1) a sensor subsystem 30 for obtaining data on vehicle performance and operating parameters; (2) an operator display 100 providing the vehicle operator with information on vehicle operational parameters; (3) a data acquisition system 52 for collecting the data from the sensors and converting the data from the sensors into digital format; and (4) a processing unit 54 for receiving the digital format data from the data acquisition system and storing, evaluating and providing reports of the data. Sensor subsystem 30 further comprises voltmeters, ammeters, thermocouples, optical shaft encoders and an inclinometer. Sensor subsystem 30 provides data to both operator display 100 and data acquisition system 52. Operator display 100 further comprises bargraphs for current draw, motor and battery temperature, accessory battery voltage, main battery voltage or "fuel level" and alphanumeric displays for vehicle speed, distance traveled, trip meter and transmission gear indicator. Processing unit 54 of the preferred embodiment is a portable or notebook type computer allowing for operator input of additional data.

Obviously many modifications and variations of the present invention may become apparent in light of the above teachings. For example, a global positioning system may be added to allow the monitoring system to perform point-to-point and terrain-based travel range predictions for the electric vehicle 12. The main battery pack 16 instantaneous current may be continually integrated over the total usage time resulting in a measurement of battery amperes/hours used. This measurement may be used to replace or supplement fuel level bargraph 106. Fuel level bargraph 106 may also be replaced or supplemented by a main battery pack 16 voltage fuel gauge which integrates the voltage over a short period of time to smooth out instantaneous voltage fluctuations due to current surges. Additionally, a fuel-mileage computer of the type used in more recent internal combustion engine dashboard displays may be incorporated into operator display 100. Further, processing unit 54 may be modified to turn on and off automatically with the :rest of the system and to sense whether to activate the Run Vehicle or Charge Vehicle mode.

In light of the above, it is therefore understood that within the scope of the appended claims, the invention may be practiced otherwise than as specifically described.

What is claimed is:

1. In an electric powered vehicle having a main electric power source transmitting power to an electric motor and having an accessory electric power source, a system for monitoring performance of said electric powered vehicle comprising:

sensor means for measuring performance characteristics of said electric powered vehicle and producing data signals corresponding to said measured performance characteristics, said sensor means comprising a first voltmeter for measuring a main voltage across said main electrical power source, a second voltmeter for measuring an accessory voltage across said accessory electric power source, a first ammeter for measuring an operating current draw of said main electrical power source when said electric powered vehicle is in an operating mode, a second ammeter for measuring a second current draw of said main electric power source when said electric powered vehicle is in an operating mode and when said electric powered vehicle is in a charging mode, a plurality of thermocouples for measuring a plurality of temperatures interior and exterior to said electric powered vehicle, a plurality of optical shaft encoders for measuring a plurality of shaft rotation rates within said electric powered vehicle and an inclinometer for measuring an angle of an incline on which said vehicle is travelling;

a data acquisition means electrically connected to said sensor means for collecting said data signals from said sensor means and converting said data signals from said sensor means into digital input signals;

a processing unit electrically connected to said data acquisition means for receiving said digital input signals from said data acquisition means, said processing unit storing and interpreting said digital input signals, said processing unit further generating reports of said performance characteristics; and an operator display electrically connected to said sensor means for displaying operating characteristics of said electric powered vehicle, said operating characteristics corresponding to at least one of said performance characteristics, said operator display located within said electric powered vehicle to be in view of an operator of said vehicle when said operator is driving said vehicle.

2. A system according to claim 1 wherein said first voltmeter is a differential voltmeter, said first voltmeter being further isolated from an electrical grounding system of said electric powered vehicle, said ground isolation allowing said first voltmeter to measure main voltage without discharging said main electric power source.

3. A system according to claim 1 wherein said first ammeter is a shunt ammeter and said second ammeter is an inductive ammeter.

4. A system according to claim 1 wherein said plurality of thermocouples further comprises:

a first thermocouple for measuring a case temperature of said main electric power source;

a second thermocouple for measuring an electrolyte temperature of said main electric power source, said second thermocouple being resistant to acid;

a third thermocouple for measuring a temperature exterior to said electric powered vehicle; and a fourth thermocouple for measuring a temperature of said electric motor.

5. A system according to claim 1 wherein said plurality of optical shaft encoders further comprises:

a first shaft encoder for providing measurements corresponding to a speed of said electric powered vehicle;

a second shaft encoder for providing measurements corresponding to a distance travelled by said electric powered vehicle; and a third shaft encoder for providing measurements corresponding to a rotation of said electric motor.

6. A system according to claim 1 wherein:

said processing unit is a portable computer having a processing power source separate from said main electric power source and separate from said accessory electric power source;

said portable computer further comprises a memory for storing additional data input into said memory by an operator of said electric powered vehicle;

said processing unit senses the position of an ignition switch of said electric powered vehicle;

said processing unit enters a standby mode when said ignition switch is in an off position, said standby mode conserving said processing power source; and said processing unit enters an active mode when said ignition switch is in an on position, said active mode storing and interpreting said digital input signals from said data acquisition means.

7. A system according to claim 1 wherein said operating characteristics further comprise:

said operating current draw;

said second current draw;

a temperature of said electric motor as measured by said plurality of thermocouples;

a temperature of said main electric power source as measured by said plurality of thermocouples;

said main voltage; and said accessory voltage.

8. A system according to claim 7 wherein said operator display further comprises:

an alphanumeric indication of a gear engaged by said electric motor;

a numeric indication of a speed of said electric powered vehicle; and a numeric indication of a distance traveled by said electric powered vehicle.

9. A system according to claim 7 wherein said operating characteristics are represented in the form of bargraphs, each one of said operating characteristics being represented by a separate bargraph.

10. A system according to claim 9 wherein a bargraph representing said operating current draw has a plurality of distinct colors, said distinct colors indicating efficient operating ranges for said electric motor.

11. A system according to claim 10 wherein a bargraph representing said main voltage indicates a fuel level, said fuel level corresponding to a level of power remaining in said main electric power source.

12. In a vehicle converted from an internal combustion engine power source to an electrical power source, a system for measuring performance characteristics of said vehicle and displaying operating characteristics of said vehicle corresponding to said performance characteristics to an operator of said vehicle, said system comprising:

sensor means for measuring said performance characteristics of said vehicle and producing data signals corresponding to said measured performance characteristics, said sensor means comprising voltmeter means for measuring a voltage of said electrical power source, ammeter means for measuring a current draw from said electrical power source, temperature sensor means for measuring temperatures of said electrical power source and of an electric motor powered by said electrical power source and causing the movement of said vehicle, shaft encoder means for measuring shaft rotations corresponding to a speed of said vehicle and to a distance travelled by said vehicle, and an inclinometer means for measuring an angle of an incline on which said vehicle is travelling;

a data acquisition means electrically connected to said sensor means for collecting said data signals from said sensor means, said data acquisition means converting said data signals to digital signals;

a portable computer unit electrically connected to said data acquisition means and having a computer power source separate from said electrical power source of said vehicle for receiving said digital signals from said data acquisition means, said portable computer unit receiving operator input signals from said operator of said vehicle, said portable computer unit storing and interpreting said digital signals and said operator input signals, said portable computer unit further generating reports of said digital signals and said operator input signals, said reports corresponding to performance characteristics of said vehicle; and an operator display electrically connected to said sensor means for displaying operating characteristics of said electric powered vehicle, said operating characteristics corresponding to at least one of said performance characteristics, said operator display replacing a dashboard display of said vehicle, said dashboard display corresponding to internal combustion operating characteristics of said vehicle operating with said internal combustion engine power source, said operator display comprising a fuel level bargraph display corresponding to said voltage, an operating range bargraph display corresponding to said current draw and color coded to indicate an efficient operating range of said electric motor, a temperature bargraph display corresponding to said measured temperatures, a first digital display corresponding to said speed and a second digital display corresponding to said distance.

13. A system according to claim 12 wherein said portable computer unit senses the position of an ignition switch of said electric powered vehicle, said portable computer unit entering a standby mode when said ignition switch is in an off position, said standby mode conserving said computer power source.

* * * * *